(12) United States Patent
Srinivasan et al.

(10) Patent No.: US 10,110,647 B2
(45) Date of Patent: Oct. 23, 2018

(54) METHOD AND APPARATUS FOR ALTERING BANDWIDTH CONSUMPTION

(71) Applicant: QUALCOMM Incorporated, San Diego, CA (US)

(72) Inventors: Chandrasekar Srinivasan, Hyderabad (IN); Umesh Pandey, Hyderabad (IN); Chandra Mouli Polisetty, San Diego, CA (US); Deepti Mani, San Diego, CA (US); Lorenz C. Minder, Berkeley, CA (US); Deviprasad Putchala, San Diego, CA (US); Arvind Subramanian Krishna, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1018 days.

(21) Appl. No.: 14/036,860

(22) Filed: Sep. 25, 2013

(65) Prior Publication Data
US 2014/0297883 A1 Oct. 2, 2014

Related U.S. Application Data

(60) Provisional application No. 61/805,929, filed on Mar. 28, 2013.

(51) Int. Cl.
*G06F 15/16* (2006.01)
*H04L 29/06* (2006.01)
(52) U.S. Cl.
CPC ...... *H04L 65/4092* (2013.01); *H04L 65/4084* (2013.01)
(58) Field of Classification Search
CPC .. H04L 65/4092; H04L 65/4084; H04L 65/60

USPC .......................................... 709/231; 345/156
See application file for complete search history.

(56) References Cited

U.S. PATENT DOCUMENTS

| | | | |
|---|---|---|---|
| 6,859,496 B1* | 2/2005 | Boroczky | H04N 21/23655 375/240 |
| 7,284,201 B2 | 10/2007 | Cohen-Solal | |
| 7,975,283 B2 | 7/2011 | Bedingfield, Sr. et al. | |
| 8,028,081 B2* | 9/2011 | Kandekar | H04N 7/17318 709/231 |
| 8,184,069 B1* | 5/2012 | Rhodes | G02B 27/017 345/8 |
| 8,184,983 B1* | 5/2012 | Ho | H04B 11/00 345/156 |
| 8,270,473 B2* | 9/2012 | Chen | H04N 19/124 375/240.03 |
| 8,578,045 B2* | 11/2013 | Bowra | H04L 12/5695 709/231 |

(Continued)

FOREIGN PATENT DOCUMENTS

EP 1843592 A1 10/2007

*Primary Examiner* — Joseph E Avellino
*Assistant Examiner* — Binod J Kunwar
(74) *Attorney, Agent, or Firm* — Norton Rose Fulbright US LLP

(57) ABSTRACT

A method for altering bandwidth consumption when receiving content in a user device includes determining a first user device status where the first user device status indicates whether content, which is being accessed by a content-rendering application, is viewable on a display of the user device, based on the first user device status, selecting one of a plurality of available alternative content segments, and receiving the selected content segment.

42 Claims, 8 Drawing Sheets

(56) References Cited

U.S. PATENT DOCUMENTS

| | | | | |
|---|---|---|---|---|
| 8,701,148 B2* | 4/2014 | Weaver | H04N 7/17318 | 370/229 |
| 8,918,636 B2* | 12/2014 | Kiefer | H04L 9/0819 | 713/150 |
| 8,918,831 B2* | 12/2014 | Meuninck | H04N 21/4314 | 725/133 |
| 9,143,812 B2* | 9/2015 | Braness | H04N 21/23439 | |
| 9,247,312 B2* | 1/2016 | Braness | G11B 27/005 | |
| 9,313,510 B2* | 4/2016 | Shivadas | H04N 19/46 | |
| 2002/0091738 A1* | 7/2002 | Rohrabaugh | G06F 9/4443 | 715/249 |
| 2003/0233464 A1* | 12/2003 | Walpole | H04L 29/06 | 709/231 |
| 2005/0091693 A1* | 4/2005 | Amine | H04N 7/18 | 725/100 |
| 2006/0171414 A1* | 8/2006 | Katibian | H04L 47/10 | 370/468 |
| 2007/0024706 A1* | 2/2007 | Brannon, Jr. | H04N 7/17318 | 348/142 |
| 2007/0136772 A1* | 6/2007 | Weaver | H04N 7/17318 | 725/95 |
| 2008/0268855 A1* | 10/2008 | Hanuni | H04W 72/0406 | 455/445 |
| 2009/0116431 A1* | 5/2009 | Cadieux | H04W 48/18 | 370/329 |
| 2010/0074324 A1* | 3/2010 | Qian | H04L 47/10 | 375/240.02 |
| 2010/0189183 A1* | 7/2010 | Gu | H04N 21/23439 | 375/240.28 |
| 2010/0251293 A1* | 9/2010 | Riggert | H04N 5/58 | 725/37 |
| 2010/0280934 A1* | 11/2010 | Kerr | G06Q 30/0283 | 705/34 |
| 2011/0122939 A1* | 5/2011 | Ganesan | H04N 19/115 | 375/240.01 |
| 2011/0157264 A1* | 6/2011 | Seshadri | G06F 3/14 | 345/698 |
| 2011/0302319 A1* | 12/2011 | Ha | H04N 21/23439 | 709/231 |
| 2012/0005368 A1* | 1/2012 | Knittle | H04N 21/23439 | 709/235 |
| 2012/0059937 A1* | 3/2012 | Dheap | H04L 47/10 | 709/226 |
| 2012/0170906 A1* | 7/2012 | Soroushian | G11B 27/005 | 386/241 |
| 2012/0170915 A1* | 7/2012 | Braness | G11B 27/005 | 386/343 |
| 2012/0173755 A1* | 7/2012 | Margulis | G06F 3/14 | 709/231 |
| 2013/0007200 A1* | 1/2013 | van der Schaar | H04L 47/12 | 709/217 |
| 2013/0007263 A1* | 1/2013 | Soroushian | H04L 47/12 | 709/224 |
| 2013/0016070 A1* | 1/2013 | Starner | G02B 27/017 | 345/175 |
| 2013/0021374 A1* | 1/2013 | Miao | G06F 3/011 | 345/633 |
| 2013/0044598 A1* | 2/2013 | Zhang | H04L 43/0882 | 370/232 |
| 2014/0043970 A1* | 2/2014 | Lientz | H04L 41/0896 | 370/230 |
| 2014/0068434 A1* | 3/2014 | Filev | G06F 3/0484 | 715/716 |
| 2014/0095729 A1* | 4/2014 | Ma | H04L 65/608 | 709/231 |
| 2014/0098748 A1* | 4/2014 | Chan | H04W 72/082 | 370/329 |
| 2014/0114753 A1* | 4/2014 | Xiao | G06Q 30/02 | 705/14.49 |
| 2014/0118250 A1* | 5/2014 | Kim | G06F 3/0481 | 345/157 |
| 2014/0269936 A1* | 9/2014 | Shivadas | H04N 19/46 | 375/240.26 |
| 2014/0297883 A1* | 10/2014 | Srinivasan | H04L 65/4084 | 709/231 |
| 2015/0067170 A1* | 3/2015 | Zhang | H04L 47/70 | 709/226 |
| 2015/0127775 A1* | 5/2015 | Munagala | H04L 65/601 | 709/219 |

* cited by examiner

METHOD AND APPARATUS FOR ALTERING BANDWIDTH CONSUMPTION

PRIORITY AND RELATED APPLICATIONS STATEMENT

The benefit of the filing date of U.S. Provisional Patent Application Ser. No. 61/805,929, filed on Mar. 28, 2013, entitled "METHOD AND APPARATUS FOR ALTERING BANDWIDTH CONSUMPTION," is hereby claimed, and the specification thereof is incorporated herein in its entirety by this reference.

DESCRIPTION OF THE RELATED ART

More and more content is being transferred over available communication networks. Often, this content includes numerous types of data including, for example, audio data, video data, image data, etc. Video data transported over a network typically consumes many times more bandwidth than does non-video data. Further, high resolution video consumes much more bandwidth than does standard resolution video. Existing ways of minimizing the amount of bandwidth needed to transport video data include compressing the video data so that it uses less memory and bandwidth, lowering the quality of the video, adjusting the time during which video is transported, and other techniques. However, they still result in a large amount of bandwidth being consumed to transport the video data.

SUMMARY

An embodiment of a method for altering bandwidth consumption when receiving content in a user device includes determining a first user device status where the first user device status indicates whether content, which is being accessed by a content-rendering application, is viewable on a display of the user device, based on the first user device status, selecting one of a plurality of available alternative content segments, and receiving the selected content segment.

An embodiment of an apparatus for altering bandwidth consumption when receiving content in a user device includes a device status determination element configured to determine a first user device status where the first user device status indicates whether content, which is being accessed by a content-rendering application, is viewable on a display of the user device. The embodiment of the apparatus further includes streaming content logic for selecting and receiving one of a plurality of available alternative content segments based on the first user device status, and the content rendering application for rendering the selected content segment.

An embodiment of a user device includes means for determining a first user device status where the first user device status indicates whether content, which is being accessed by a content-rendering application, is viewable on a display of the user device. The embodiment of the user device further includes means for, based on the first user device status, selecting one of a plurality of available alternative content segments, and means for receiving the selected content segment.

An embodiment of processor-executable instructions for performing a method for altering bandwidth consumption when receiving content in a user device, the method including determining a first user device status where the first user device status indicates whether content, which is being accessed by a content-rendering application, is viewable on a display of the user device, based on the first user device status, selecting one of a plurality of available alternative content segments, and receiving the selected content segment.

An embodiment of a method for altering bandwidth consumption when receiving content in a user device includes determining a first user device status where the first user device status indicates whether there is a display externally connected to the user device that is larger than an internal display of the user device, based on the first user device status, selecting one of a plurality of available alternative content segments, and receiving the selected content segment.

An embodiment of a method for altering bandwidth consumption when receiving content in a user device includes determining a first user device status where the first user device status indicates a size of a window that is associated with a content-rendering application that is accessing the content, based on the first user device status, selecting one of a plurality of available alternative content segments, and receiving the selected content segment.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
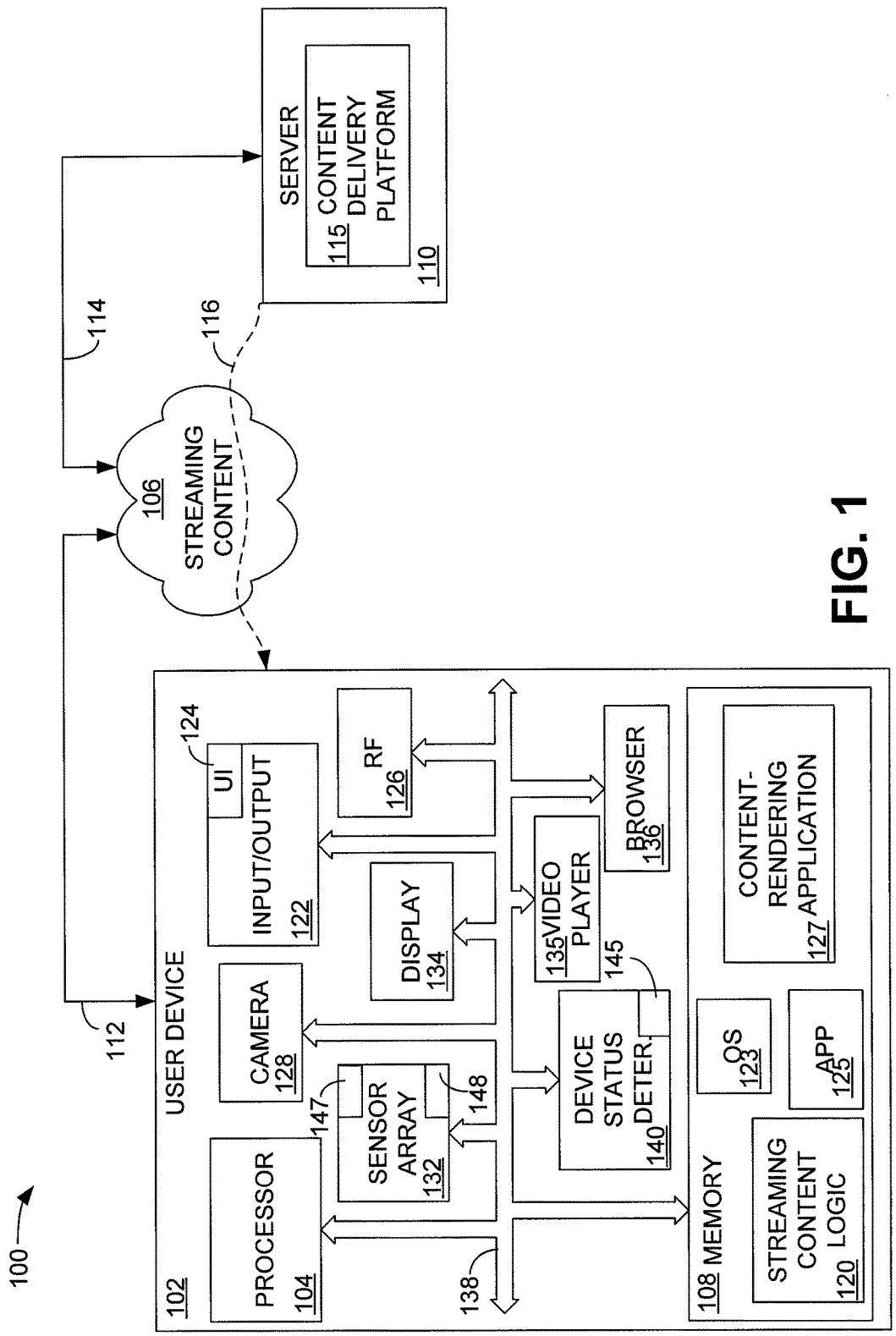
FIG. 1 is a functional block diagram of an embodiment of an apparatus for altering bandwidth consumption.

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the term "content" may include data having video, audio, combinations of video and audio, or other data at one or more quality levels, the quality level determined by bit rate, resolution, or other factors. The content may also include executable content, such as: object code, scripts, byte code, markup language files, and patches. In addition, "content" may also include files that are not executable in nature, such as documents that may need to be opened or other data files that need to be accessed.

As used in this description, the term "content segment" refers to one or more portions of content that may be received at a user device.

As used in this description, the term "streaming content" refers to content that may be sent from a server device and received at a user device according to one or more standards that enable the real-time transfer of content. Examples of streaming content standards include those that support de-interleaved (or multiple) channels and those that do not support de-interleaved (or multiple) channels.

A standard that supports de-interleaved (or multiple) channels may include content having different data, such as audio data and video data, where the different data are included in different channels or data streams. For example, in a standard that supports de-interleaved (or multiple) channels, a user can request audio data and video data in separate channels or data streams where, for example, a first channel or data stream may carry audio data and a second channel or data stream may carry video data. Such a standard may comprise content segments having different content (audio only, video only, or a combination of audio and video) at the same or differing resolutions.

A standard that does not support de-interleaved (or multiple) channels may include content having different data, such as audio data and video data, where the different data are included in the same channels or data streams. For example, in a standard that does not support de-interleaved (or multiple) channels, a user can request audio data, video data, a combination of audio and video data, and other types of data in a single channel or data stream. A standard that does not support de-interleaved (or multiple) channels may comprise content segments having similar content (audio only, video only, or a combination of audio and video) at the same or differing resolutions.

As used in this description, the term "content identifier" refers to one or more lists, manifests, configuration files, or other identifiers that may identify the content or that may identify one or more content segment.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

As used herein, the terms "user device" and "client device" include a device capable of requesting and receiving content from a web site and transmitting information to a website. A user device or client device can be a stationary device or a mobile device. The terms "user device" and "client device" can be used interchangeably.

As used herein, the term "user" refers to an individual receiving content on a user device or on a client device and transmitting information to a website.

FIG. 1 is a functional block diagram of an embodiment an apparatus for altering bandwidth consumption. The apparatus 100 comprises a user device 102, a network 106, and a server 110. The user device 102 can be connected to the network 106 over a bi-directional connection 112. The connection 112 can be a wired connection or can be a wireless connection. In an embodiment, the connection 112 can be a wireless connection, such as a cellular 4G connection, a wireless fidelity (WiFi) connection, a BLUETOOTH connection, or another wireless connection. The server 110 can be any server that can deliver streaming content to the user device 102. In one non-limiting example, the server 110 can be a web server configured as a hypertext transfer protocol (HTTP) web server and can include a content delivery platform 115. The content delivery platform 115 can be any system or methodology that can deliver content to the user device 102. The server 110 can be connected to the network 106 over a bi-directional connection 114. The connection 114 can be a wired connection or can be a wireless connection. The network 106 can be a wireless network, a wired network, a wide area network (WAN), a local area network (LAN), or any other network. In an embodiment, the network 106 can comprise at least portions of the Internet.

The user device 102 can comprise a wired device, a wireless device, a personal computing device, a tablet or pad computing device, a portable cellular telephone, a WiFi enabled device, a BLUETOOTH enabled device, a television, a pair of glasses having a display, a pair of augmented reality glasses, or any other communication, computing or interface device connected to the network 106 and can communicate with the server 110 using any available methodology or infrastructure. The user device 102 can also be referred to as a "client device" because it can function as, or be connected to, a device that functions as a client of the server 110.

The user device 102 comprises a processor 104, a memory 108, an input/output (I/O) element 122, a user interface 124, a radio frequency (RF) module 126, a camera 128, a sensor array 132, a display 134, a video player 135, a browser 136, and a device status determination element 140, operatively connected over a bus 138. The bus 138 comprises the logical and physical connections to allow the connected elements, modules, and components to communicate and interoperate. In an embodiment, the video player 135 may be external to the browser 136 as shown, or may be part of the browser 136 or the browser 136 may comprise a video player, or may have the capability to invoke a video player.

The memory 108 can be any type of volatile or non-volatile memory, and in an embodiment, can include flash memory. The memory 108 can be permanently installed in the user device 102, or can be a removable memory element, such as a removable memory card. The memory 108 comprises an operating system module 123, one or more application modules 125, streaming content logic 120 and a content-rendering application 127. The operating system module 123 can be any operating system associated with the user device 102 and which controls the operation, functionality, and other aspects of the user device 102. The application module 125 can be one of a number of different application modules and can comprise more than one application module. The streaming content logic 120 can be software, firmware, a combination of software and firmware, or any code that allows the user device 102 to request and receive streaming content from the server 110. The content-rendering application 127 can be any module that renders content on the display 134 for viewing by a user of the device 102. The content-rendering application 127 may interoperate with the video player 135, the browser 136, or another element or module that can play video. The transfer of streaming content from the server 110 to the user device 102 is indicated using arrow 116.

The processor 104 can be any general purpose or special purpose processor capable of executing instructions to control the operation and functionality of the user device 102. Although shown as a single element, the processor 104 may comprise multiple processors, or a distributed processing architecture.

The I/O element 122 can include, for example, a microphone, a keypad, a speaker, a pointing device, a touch-sensitive screen, user interface control elements, and any other devices or systems that allow a user to provide input commands and receive outputs from the user device 102. The user interface 124 can be part of the I/O element 122 as shown, or can be a separate element.

In an embodiment, the RF module 126 can comprise a wired or a wireless transceiver. Although details are not shown for clarity, the RF module 126 generally comprises a transmit module having modulation, upconversion and amplification circuitry for preparing a baseband information signal for transmission, a receive module having amplification, filtering and downconversion circuitry for receiving and downconverting an RF signal to a baseband information signal to recover data, and a front end module (FEM) that includes diplexer circuitry, duplexer circuitry, or any other circuitry that can separate a transmit signal from a receive signal, as known to those skilled in the art.

The camera 128 can be a still camera, a video camera, or both a still camera and a video camera that can be incorporated into the user device 102. In an embodiment, the camera 128 can be used to determine a device status by being activated to determine whether the display 134 is capable of being viewed by a user.

The sensor array 132 can comprise a number of different sensors. The sensor array 132 can comprise a proximity sensor 147 to determine one or more parameters of the user device 102 related to proximity and a light sensor 148 to determine ambient light. The proximity sensor 147 can comprise one or more devices or elements that can sense the proximity of the user device 102. Examples of proximity parameters include, but are not limited to, the relative position, orientation, location, use mode, or proximity, of the user device 102 to a user. The term proximity includes, for example, the position, orientation, or location of the user device 102 with respect to a user of the device 102 and the ability of the user to view the display 134. The light sensor 148 can be, for example, a photocell or another element that can sense ambient light, which can indicate an ability of the user device 102 to display content or the ability of a user to view content. The sensor array 132 may include the ability to detect any other proximity-related parameter related to the user device 102. As an example, if the user device 102 is a portable telephone type of device, the sensor array 132 can comprise one or more sensors to determine if the user device 102 or the display 134 is covered, can determine whether the user device 102 is being held up to the ear of a user, or can include sensors to detect other locations, positions and other proximity determination parameters. As another example, if the user device 102 is a pair of glasses, the sensor array 132 can comprise one or more sensors to determine whether the user device 102 is located on the face of a user, whether the glasses are open or closed or folded, or can include sensors to detect other locations, positions and other proximity determination parameters. If the user device 102 is a pair of augmented reality glasses, the sensor array 132 can comprise one or more sensors to determine whether a display associated with the augmented reality glasses is being viewed by a user wearing the glasses, or whether the user may be viewing a live-action scene indicating that the user is not viewing the display. Further, the sensor array 132 may incorporate one or more elements of the I/O element 122. For example, a microphone or speaker (not shown) that may be part of the I/O element 122 can be operatively connected to the sensor array 132 so that such element or elements can also provide an input to the sensor array 132.

The display 134 allows a user of the device 102 to view rendered video and other rendered content on the user device 102.

The browser 136 can be a web browser, such as a hypertext transfer protocol (HTTP) web browser for accessing and viewing web content and for communicating via HTTP with the server 110 over connections 112 and 114, via the network 106, if the server 110 is a web server. As an example, an HTTP request can be sent from the browser 136 in the user device 102, over connections 112 and 114, via the network 106, to the server 110. An HTTP response can be sent from the server 110, over connections 114 and 112, via the network 106, to the browser 136 in the user device 102.

The device status determination element 140 can comprise the logic and functionality to determine a status of the user device 102. The device status determination element 140 can comprise software, hardware, logic, or any combination of these, to receive and process information from any or all of the sensor array 132, the camera 128, and the display 134, and interact with the streaming content logic 120, to request content from the server 110 based on any of whether a user is viewing the user device 102, whether a user is capable of viewing the user device 102, whether the user device 102 is displaying video, and whether the user device is capable of displaying video.

The device status determination element 140 can comprise a viewing status indicator 145, which can be a bit, or another indicator that can be set in the device status determination element 140 to indicate viewer status and/or the status of the user device 102, including, but not limited to, an ability of a viewer to observe a display, an interest or attention level of a viewer, the ability of the user device 102 to display content, the position, orientation, or other attribute of the user device 102 that affects the ability of the user device 102 to display content, an ability of one or more software modules or applications to display content or have content viewed, and other status indications.

Figure 2:
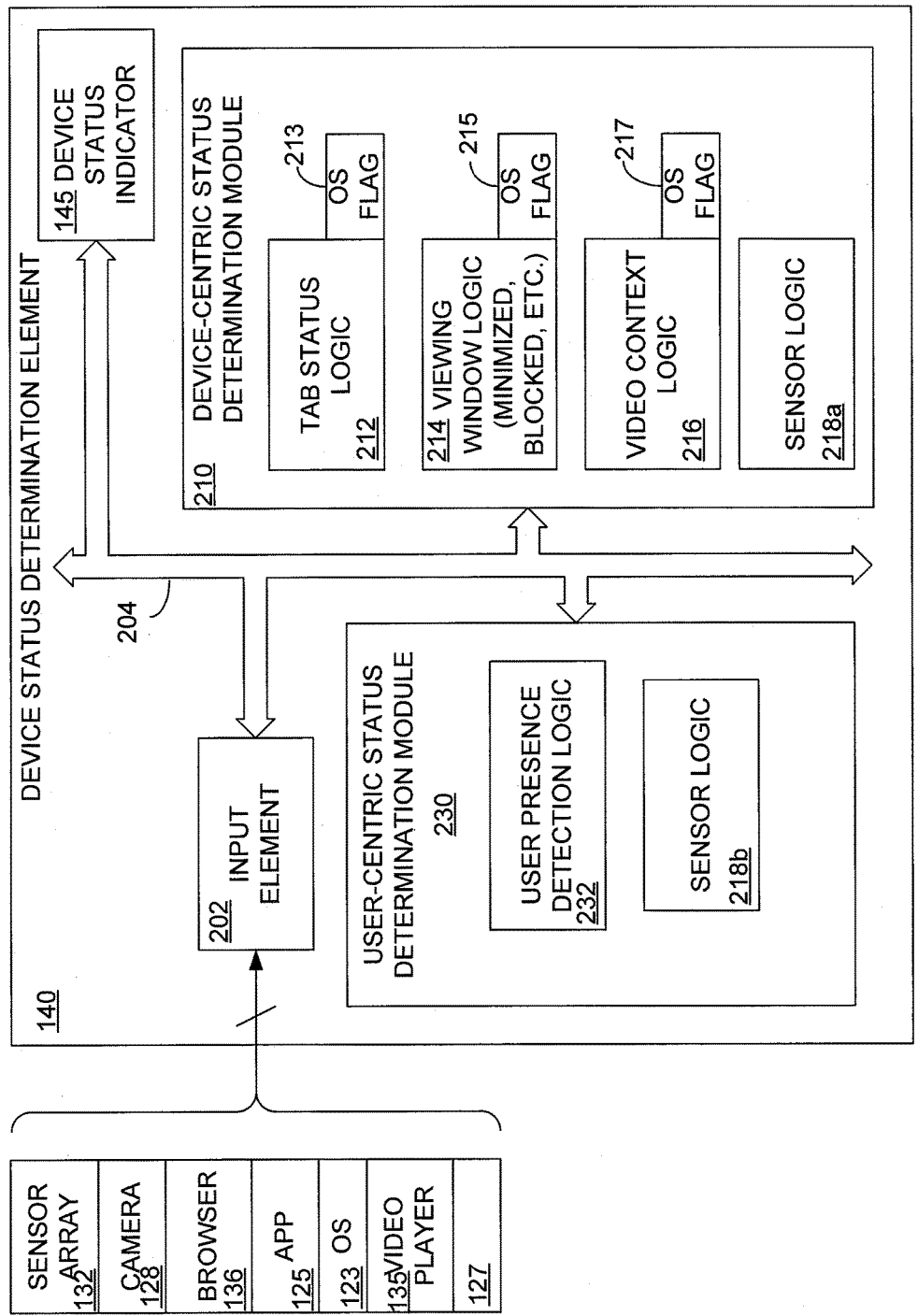
FIG. 2 is a functional block diagram of an embodiment of the device status determination element of FIG. 1.

FIG. 2 is a functional block diagram of an embodiment of the device status determination element of FIG. 1. Generally, the device status determination element 140 comprises an input element 202 configured to receive the various device status inputs from the sensor array 132, camera 128, video player 135, browser 136, application module 125, operating system module 123 and content-rendering application 127 of FIG. 1. The device status determination element 140 also generally comprises a device-centric status determination module 210 and a user-centric status determination module 230 connected to the input element 202 and to the device status indicator 145 over a system bus 204.

As its name implies, the device-centric status determination module 210 generally receives and processes information related to the status or condition of the user device 102 as it relates to the ability of the user device 102 to display video that can be viewed by a user. For example, the device-centric status determination module 210 may comprise a tab status logic 212, a viewing window logic 214, a video context logic 216 and a sensor logic 218*a*. Each of the tab status logic 212, viewing window logic 214, and video context logic 216 may have an associated operating system (OS) flag 213, 215 and 217, respectively. The operating system flags 213, 215 and 217 can function to communicate device-centric status based on conditions determined by the various logic elements within the device-centric status determination module 210.

The tab status logic 212 can determine whether a tab, which is associated with the content-rendering application 127, is selected. Determining whether a tab associated with the content-rendering application 127 is selected can be used to determine whether the user device 102 is capable of displaying content on the display 134.

The viewing window logic 214 can determine whether a window, which is associated with the content-rendering application 127 and configured to display content, is visible to a user of the device 102. Determining whether a window associated with the content-rendering application 127 is visible can be used to determine whether the user device 102 is capable of displaying content on the display 134.

The viewing window logic 214 can also determine whether a window, which is associated with the content-rendering application 127 and configured to display content, is minimized. Determining whether a window associated with the content-rendering application 127 is minimized can be used to determine whether the user device 102 is capable of displaying content on the display 134.

The viewing window logic 214 can also determine whether a window, which is associated with the content-rendering application 127 and configured to display content, is at least partially covered by a second window. Determining whether a window associated with the content-rendering application 127 is at least partially covered by a second window can be used to determine whether the user device 102 is capable of displaying content on the display 134.

The video context logic 216 can determine whether the content-rendering application 127 is rendering video in the context of the active process. One way of determining whether the content-rendering application 127 is rendering video in the context of the active process is to identify whether video is being played. This can be done by comparing a display buffer output in small intervals of time. If the buffer output is rapidly changing, then it can be assumed that video is being displayed. Another way is to determine whether the process running the video is the process that is providing an output to the display buffer.

The sensor logic 218*a* can receive and process inputs from the sensor array 132, including a proximity sensor 147, a light sensor 148, and other sensors to determine whether the user device 102 is displaying or is capable of displaying video to a user.

The proximity sensor 147 can be used to analyze a position, relative position with respect to a user, a location, or another proximity parameter of the user device 102 to determine whether the user device 102 is displaying or is capable of displaying content on a display 134. The proximity sensor 147 can be used to determine whether the display 134 is covered.

In an embodiment, the light sensor 148 can also be used to determine whether the display 134 is covered. In an embodiment, the light sensor 148 can be a photocell or other photosensitive element that can determine an amount of ambient light. The camera 128 can also be used to determine whether the display 134 is covered.

In an embodiment where the user device 102 is a pair of glasses having a display, the proximity sensor 147 can include logic and functionality to determine whether the glasses are being worn, whether the glasses are closed, and whether the glasses are folded.

As its name implies, the user-centric status determination module 230 generally receives and processes information related to the status or condition of the user as it relates to the ability of the user to view the display. For example, the user-centric status determination module 230 may comprise user presence detection logic 232 and sensor logic 218*b*. In an embodiment, the user presence detection logic 232 can receive and process inputs from the camera 128 to determine whether the user is viewing or is capable of viewing video on the display 134 associated with the user device 102.

In an embodiment where the user device 102 is a pair of glasses having a display, the user presence detection logic 232 can include logic and functionality to determine whether a user is viewing the display of the glasses, or whether the user is viewing a live-action scene, where the user viewing a live-action scene indicates that the user is not viewing the display. For example, the camera 128 can operate in conjunction with the user presence detection logic 232 to obtain an image of the user's eye relative to the display and determine whether the user is viewing the display, or viewing a live-action scene.

Figure 3:
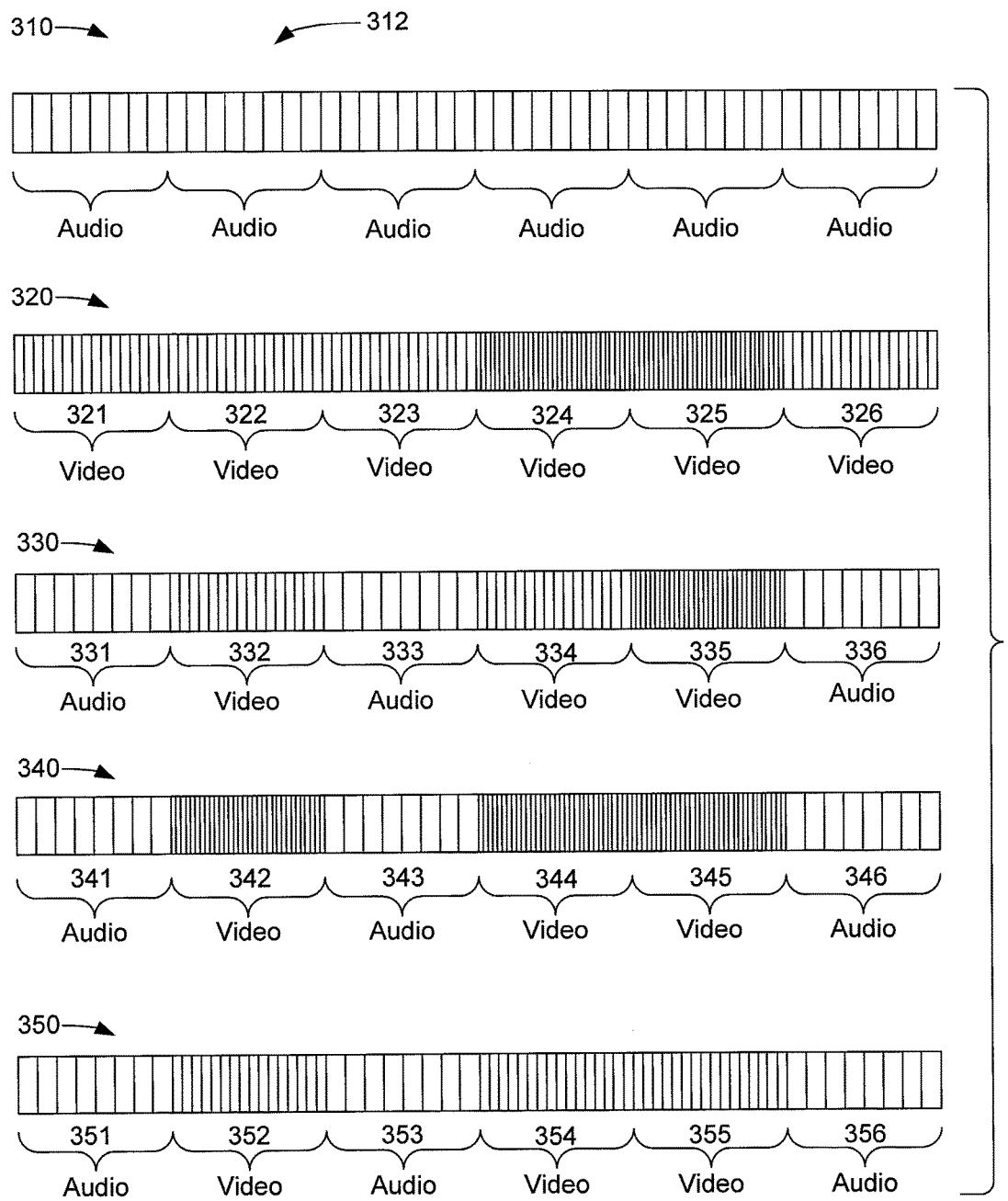
FIG. 3 is a diagram illustrating examples of data streams and content segments.

FIG. 3 is a diagram illustrating examples of data streams and content segments. A data stream 310 comprises content segments 312, which, in this example, can be audio content segments. In this example, each of the content segments 312 can occur at a first content quality or resolution.

A data stream 320 comprises content segments 321, 322, 323, 324, 325 and 326. In this example, the content segments in the data stream 320 all comprise video content segments, where the content segments 321, 322, 323 and 326 are illustrated as having a first content quality or resolution, and the content segments 324 and 325 are illustrated as having a second content quality or resolution. In this example, the content segments 324 and 325 have a content quality or resolution that is higher than the content quality or resolution of the content segments 321, 322, 323 and 326. In this example, the data streams 310 and 320 each contain only one type of content, although data stream 320 comprises the same type of content segments having different content quality or resolution. Moreover, the first content quality or resolution for the content segments 312 in data stream 310 can be different than the first content quality or resolution for the content segments 321, 322, 323 and 326 in data stream 320.

A data stream 330 comprises content segments 331, 332, 333, 334, 335 and 336. In this example, the content segments in the data stream 330 comprise both audio and video content segments, where the content segments 331, 333 and 336 comprise audio content segments and the content segments 332, 334 and 335 comprise video content segments. The audio content segments 331, 333 and 336 can have a first content quality or resolution, the video content segments 332 and 334 are illustrated as having a first content quality or resolution, and the video content segment 335 is illustrated as having a second content quality or resolution. The first content quality or resolution for the audio content segments 331, 333 and 336 can be different than the first content quality or resolution of the video content segments 332 and 334. In an embodiment, the video content segments 332 and 334 can contain "standard definition" video and the video content segment 335 can contain "high definition" video content. In this example, the data stream 330 contains two types of content, audio and video, and the two types of content can occur at more than one content quality or resolution.

A data stream 340 comprises content segments 341, 342, 343, 344, 345 and 346. In this example, the content segments in the data stream 340 comprise both audio and video content segments, where the content segments 341, 343 and 346 comprise audio content segments and the content segments 342, 344 and 345 comprise video content segments. In this example, all of the video content segments 342, 344 and 345 are illustrated as having a second content quality or resolution, in that they are high-resolution content segments. In this example, the data stream 340 contains at least two types of content, audio and video.

A data stream 350 comprises content segments 351, 352, 353, 354, 355 and 356. In this example, the content segments in the data stream 350 comprise both audio and video content segments, where the content segments 351, 353 and 356 comprise audio content segments and the content segments 352, 354 and 355 comprise video content segments. In this example, after the operation of an embodiment of the method and apparatus for altering bandwidth consumption, all of the video content segments 352, 354 and 355 are illustrated as having a first content quality or resolution, which quality is reduced from the content quality depicted in data stream 340. For example, the quality or resolution of the content segments 342, 344 and 345 shown in data stream 340 is reduced to a lower content quality as shown by content segments 352, 354 and 355.

Alternative embodiments for adjusting content quality include, but are not limited to, removing video content segments entirely from a data stream, selectively altering a content quality of selected available content segments, removing an entire content stream, or any combination of delivering variable quality or resolution based on viewer status determination.

Figure 4:
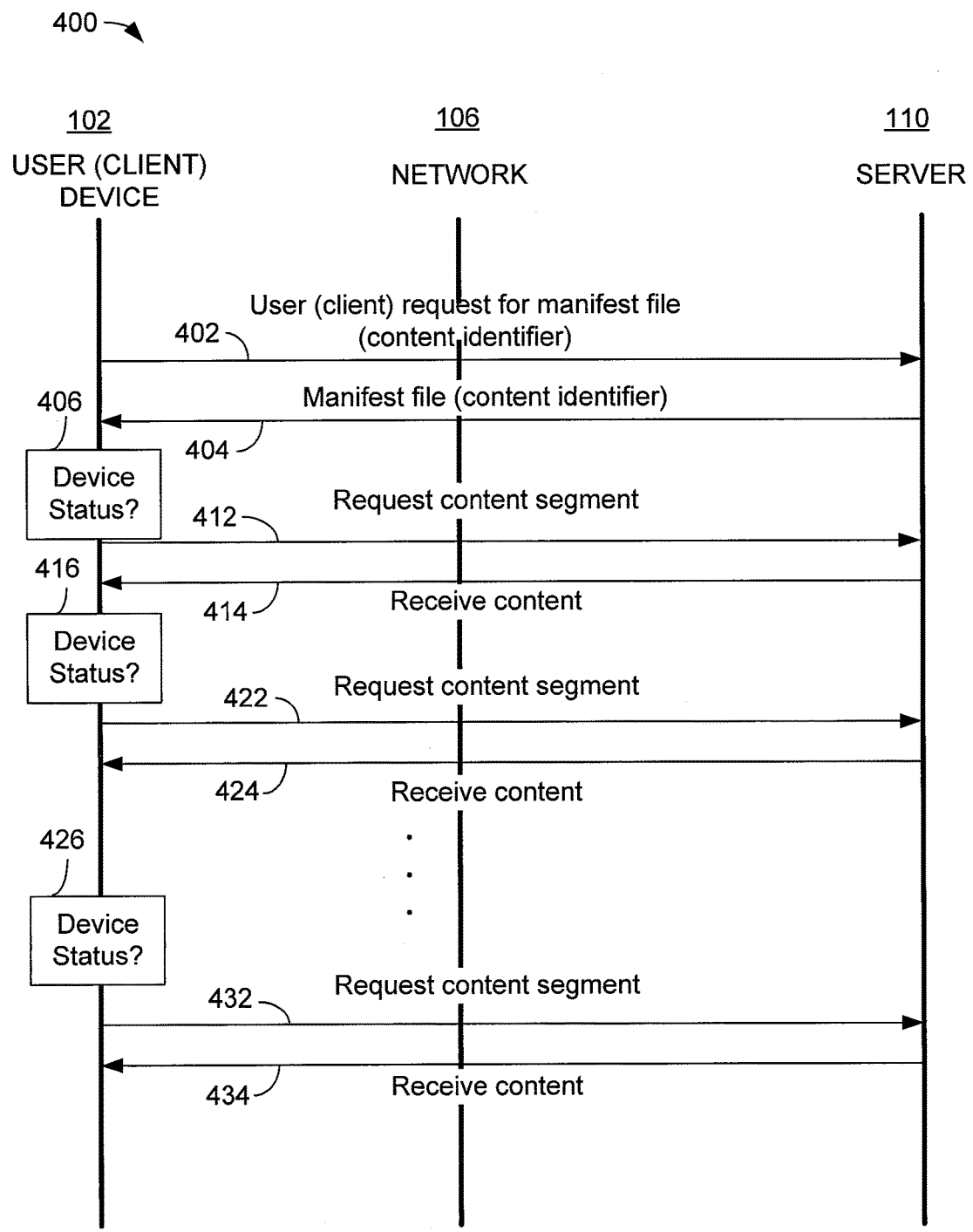
FIG. 4 is a call flow diagram of an embodiment of a method for altering bandwidth consumption.

FIG. 4 is a call flow diagram 400 of an embodiment of a method for altering bandwidth consumption.

The call 402 represents the user device 102 sending a request to the server 110 via the network 106. The request can be any client-server request and will vary depending on the type of protocol being used. If the server 110 is an HTTP server, then the request can be an HTTP request.

The call 404 represents the server 110 responding to the request with a content identifier. In an embodiment, the call 404 may include a content identifier, which may be a configuration file or a manifest file that identifies a plurality of available alternative content or content segments. For example, in the DASH (Dynamic Adaptive Streaming over HTTP) standard, a manifest file includes configuration information which allows the user device 102 to identify the desired content to the server 110 from a list of available content segments.

The content identifier identifies the available content and content segments, and includes attributes of the content or content segments. In an embodiment, the attributes can be file size, quality, resolution, rate, or other attributes. The content segments can include video content, audio content, a combination of audio and video content, or other content. While the method and apparatus for altering bandwidth consumption is applicable to any type of content, the description to follow will generally consider an operational aspect where the content is primarily video content, audio content, or a combination of video and audio content. Moreover, it is assumed that video content consumes significantly more bandwidth that does audio content, and that high resolution video content consumes significantly more bandwidth than does lower, or standard definition video content.

In an embodiment where the streaming standard is a standard that does not support de-interleaved (or multiple) channels, the content segments may include video content, audio content, and a combination of audio and video content, but each content segment may have similar data (all of the content) at a different resolution or bit rate, resulting in a difference in quality. For example, a first content segment may have data at a first resolution or bit rate, and a second content segment may have data at a second resolution or bit rate where the first resolution or bit rate is different than the second resolution or bit rate. Generally, the higher the resolution or bit rate, the higher the quality.

In an embodiment where the streaming standard is a standard that supports de-interleaved (or multiple) channels, the content segments may include video content, audio content, and a combination of audio and video content, but each content segment may have different data at a different resolution, bit rate or quality, and may also have only one type of data. For example, a content segment may have only audio data or only video data, and further, may have only data at a first resolution or bit rate, while a second content segment may have the same data at a second resolution or bit rate, where the first resolution or bit rate is different than the second resolution or bit rate.

The operation 406 represents the user device 102 determining a first user device status where the first user device status indicates whether content is viewable on a display of the user device. The device status will be described in greater detail below, and generally comprises the operation of the device status determination element 140 (FIG. 2). For example, a request for a content segment may be predicated on the user device 102 determining whether a user is viewing the user device 102, whether a user is capable of viewing the user device 102, whether the user device 102 is displaying video, and whether the user device is capable of displaying video.

The call 412 represents the user device 102 requesting a content segment based on the device status determined in operation 406.

The call 414 represents the server 110 delivering the requested content segment to the user device 102. The user device 102 may receive and render some or all of the content segment.

The operation 416 represents the user device determining a subsequent user device status where the subsequent user device status indicates whether content is viewable on a display of the user device. Based on the subsequent device status, the user device 102 may switch from requesting and rendering one or more content segments having a first content quality to requesting and rendering one or more content segments having a different second content quality. For example, the user device 102 may request a first content segment having a first content quality, may receive and render the first content segment, and may subsequently determine a subsequent device status.

The call 422 represents the user device 102 requesting a content segment based on the subsequent device status determined in operation 416. Based on the subsequent device status, the user device 102 may select a second content segment having a second content quality, and may request the second content segment.

The call 424 represents the server 110 delivering the requested content segment to the user device 102. The user device 102 may receive and render some or all of the second content segment.

The operation 426 represents the user device determining a subsequent device status before requesting the next content segment.

The call 432 represents the user device 102 requesting a content segment based on the subsequent device status determined in operation 416.

The call 434 represents the server 110 delivering the requested content segment to the user device 102. The user device 102 may receive and render some or all of the content segment.

Figure 5:
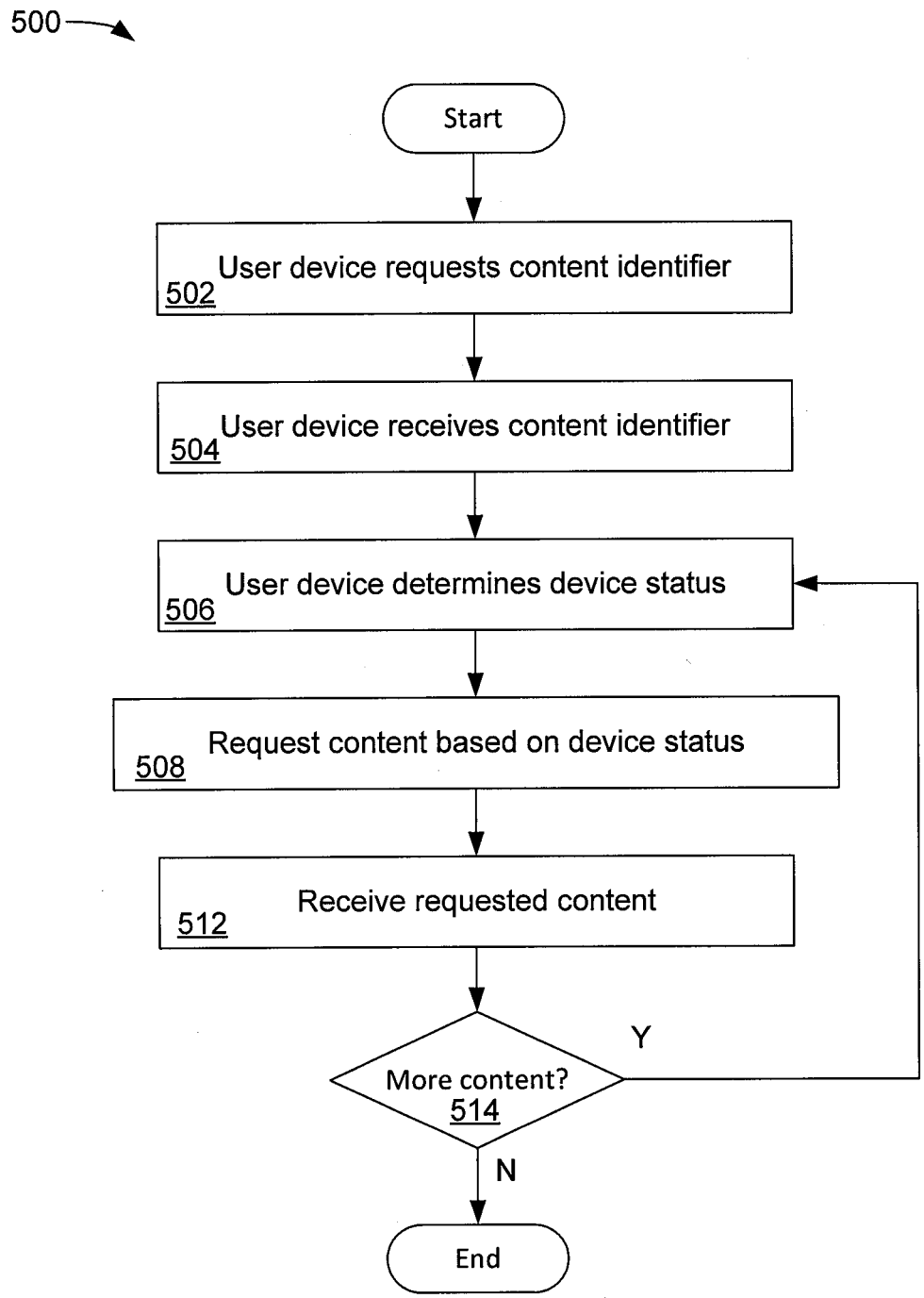
FIG. 5 is a flowchart of an embodiment of a method for altering bandwidth consumption.

FIG. 5 is a flowchart of an embodiment of a method 500 for altering bandwidth consumption. In block 502, the user device 102 requests a content identifier.

In block 504, the server responds to the request with a content identifier. In an embodiment, a content identifier can be a configuration file or a manifest file that identifies the available alternative content or content segments. The content identifier identifies the available alternative content and content segments, and includes attributes of the content or content segments. In an embodiment, the attributes can be file size, quality, resolution, rate, or other attributes. The content segments can include video content, audio content, a combination of audio and video content, or other content.

In block 506, the user device 102 determines the device status of the user device 102. The operation of the device status determination element 140 (FIG. 2) will be described in greater detail in FIGS. 6A and 6B.

In block 508, the user device 102 requests content or a content segment based on the device status determined in block 506.

In block 512, the user device receives and renders the requested content.

In block 514 it is determined whether there is more content to request. If it is determined that there is more content to request, then the process returns to block 506 and the process of blocks 506, 508 and 512 is repeated. If it is determined in block 514 that there is no more content to request, then the process ends.

Figure 6A:
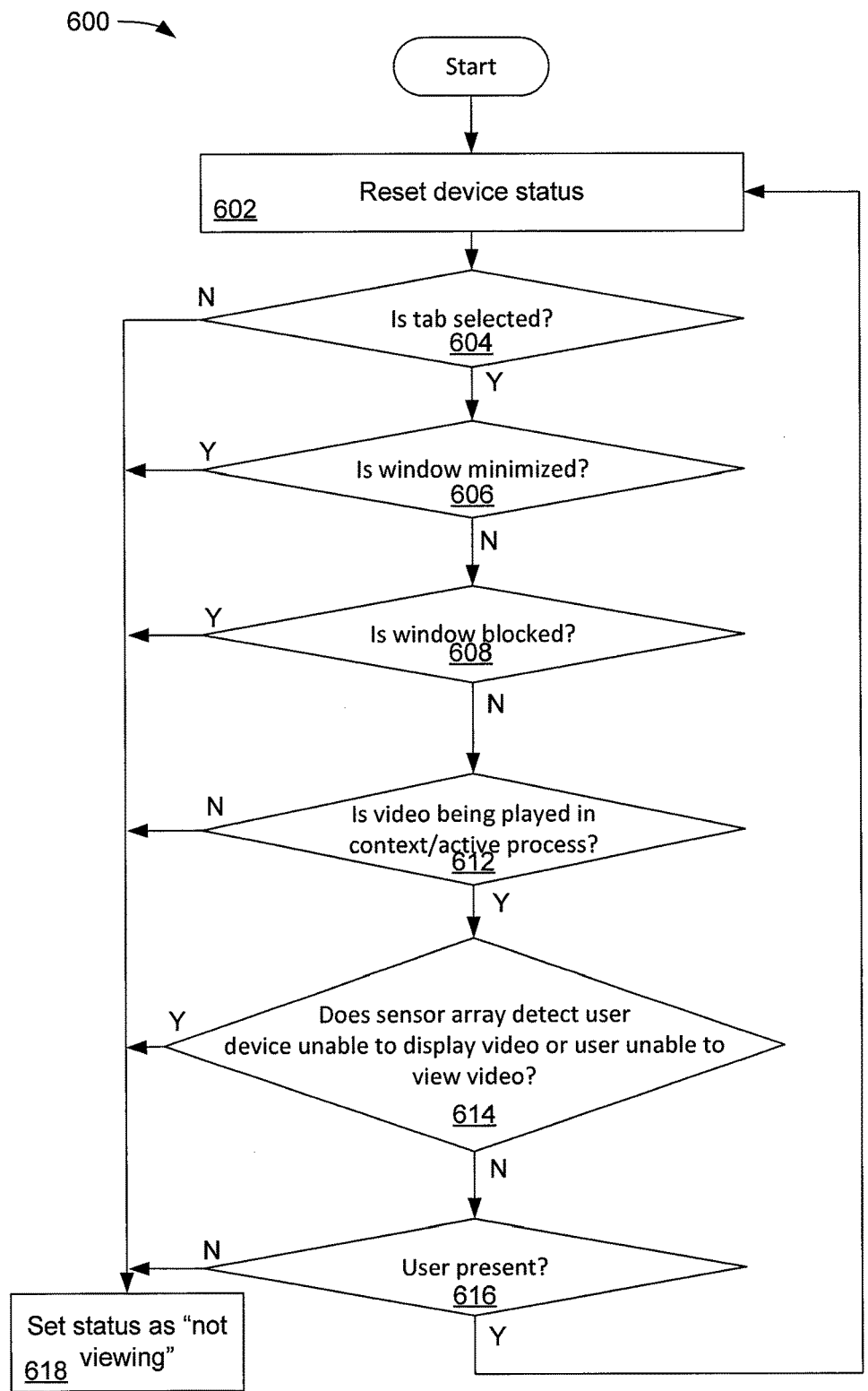
FIGS. 6A and 6B are a flow chart collectively illustrating an embodiment of a method for determining device status.
Figure 6B:
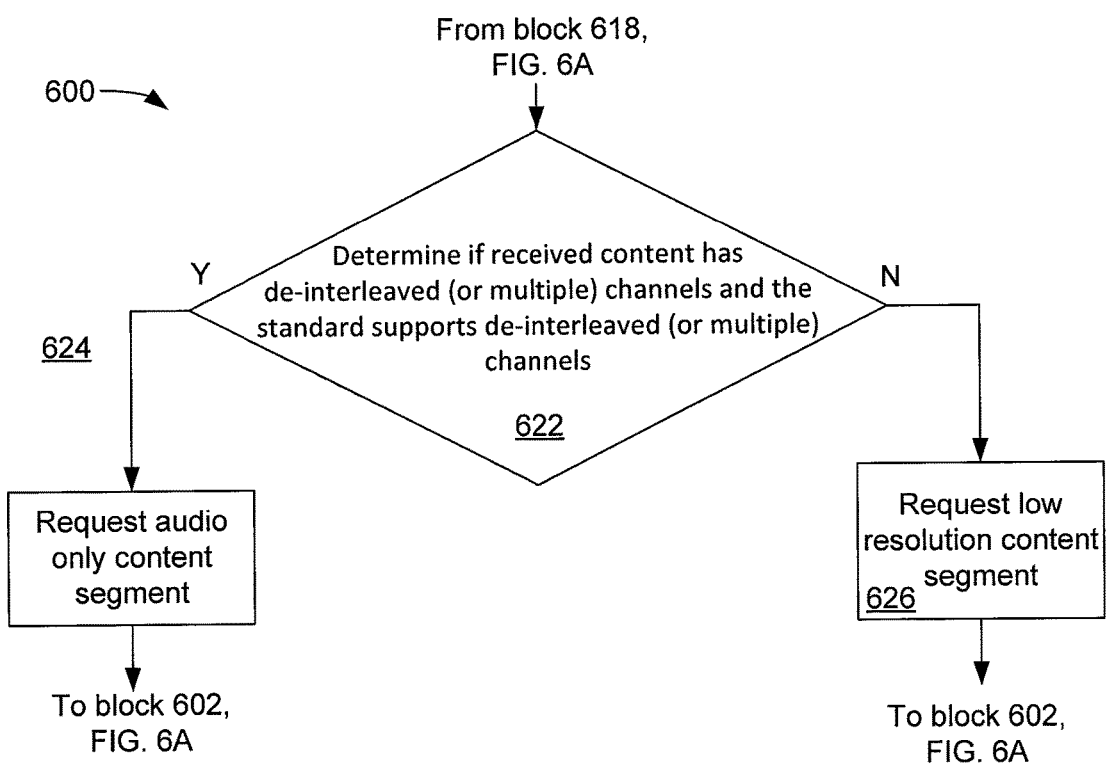
Figure 7A:
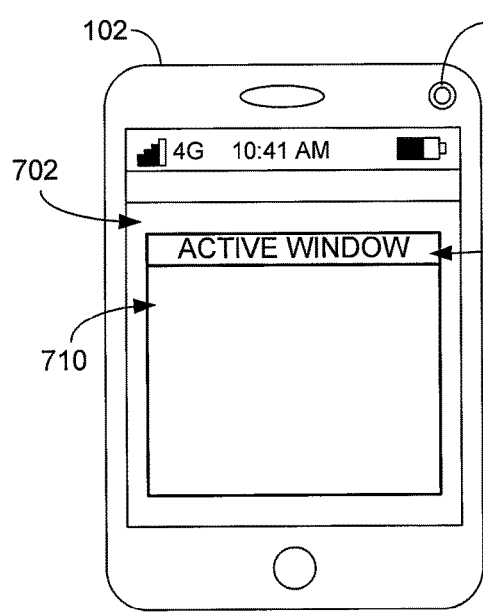
FIGS. 7A, 7B and 7C are diagrams illustrating embodiments of determining device status of a user device.
Figure 7B:
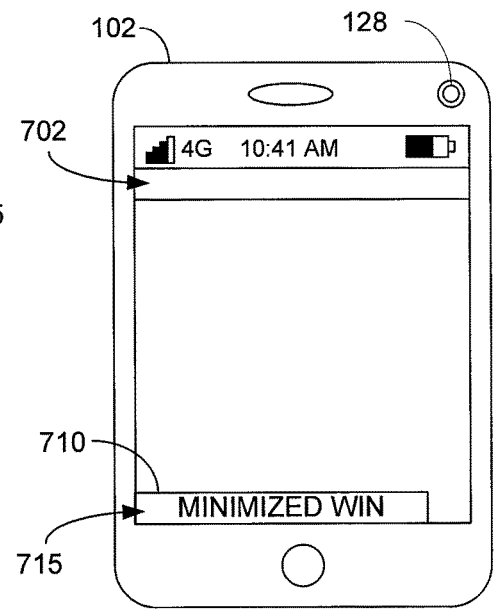
Figure 7C:
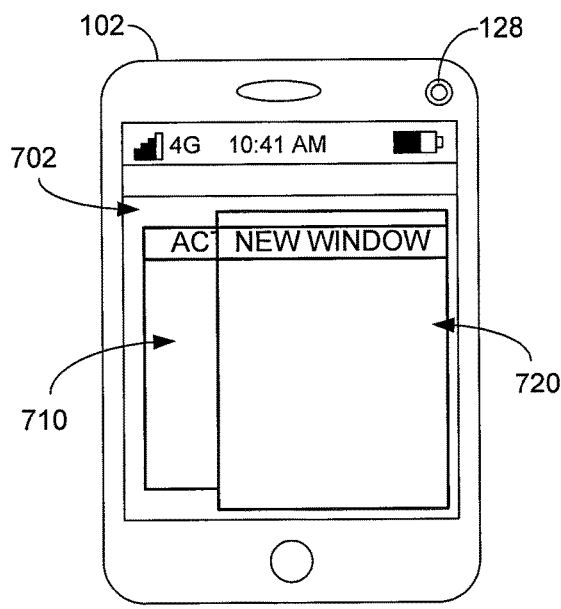

FIGS. 6A and 6B are a flow chart collectively illustrating an embodiment of a method for determining device status of block 506 of FIG. 5. The blocks in the flow chart 600 can be performed in or out of the order shown, and in an embodiment, can be performed at least partially in parallel. FIGS. 7A, 7B and 7C are diagrams illustrating embodiments of determining device status of a user device. At least a portion of the description of the flow chart 600 will also refer to FIGS. 7A, 7B and 7C.

In block 602, the device status indicator 145 (FIG. 2) is reset to indicate that a viewer is viewing video, or that a user device is capable of displaying video.

In block 604, it is determined whether a tab, which is associated with the content-rendering application, is selected. Referring to FIG. 7A, a user device 102 comprises a display 702 having a window 710 where the tab 715 is selected so that the window 710 is considered to be an "active window" that is, or that is capable of, displaying video. The tab status logic 212 (FIG. 2) can include such logic and can set an OS flag 213 to indicate whether the window 710 is considered to be an "active window" that is or that is capable of displaying video that is rendered by the content-rendering application 127.

If it is determined in block 604 that the tab 715 is not selected, then the process proceeds to block 618 and the status indicator 145 (FIG. 2) is set to indicate that video is not being viewed. If it is determined in block 604 that the tab 715 is selected, then video either is or is capable of being viewed and the process proceeds to block 606.

In block 606, it is determined whether a window, which is associated with the content-rendering application 127 and configured to display content, is visible. Referring to FIG. 7B, a user device 102 comprises a display 702 having a window 710 where the tab 715 is minimized, or not selected, so that the window 710 is not capable of being viewed or of displaying video. The viewing window logic 214 (FIG. 2) can include such logic and can set an OS flag 215 to indicate whether the tab 715 is minimized, or not selected, so that the window 710 is not capable of being viewed or of displaying video.

If it is determined in block 606 that the window 710 is minimized, then the process proceeds to block 618 and the status indicator 145 (FIG. 2) is set to indicate that video is not being viewed. If it is determined in block 606 that the viewing window is not minimized, then video either is or is capable of being viewed and the process proceeds to block 608.

In block 608, it is determined whether a window relating to a video content segment is being blocked, covered, or is otherwise not visible. Referring to FIG. 7C, a user device 102 comprises a display 702 having a window 710 which is being blocked by a second window 720, so that the window 710 is at least partially obscured by the second window 720. Depending on the degree to which the window 710 is obscured by the second window 720, it may be indicated that the window 710 is not capable of being viewed by a user. The viewing window logic 214 (FIG. 2) can include such logic and can set an OS flag 215 to indicate whether the window 710 is being blocked by a second window 720, so that the window 710 is at least partially obscured by the second window 720.

If it is determined in block 608 that the viewing window is being blocked, or sufficiently obscured, then the process proceeds to block 618 and the status indicator 145 (FIG. 2) is set to indicate that video is not being viewed. If it is determined in block 608 that the window is not being blocked or otherwise obscured, then video either is or is capable of being viewed then the process proceeds to block 612.

In block 612, it is determined whether the video is being played in the context of the active process. For example, the video context logic 216 (FIG. 2) can cause the OS flag 217 to identify the order of the windows and can be used to identify which window is on top of the others. Referring to FIG. 7C, the OS flag 217 would indicate that the window 720 is on top of the window 710, thereby indicating that the window 710 is at least partially obscured by the browser window 720, and is or may not be capable of being viewed by a user. Alternatively, referring to FIG. 7A, the video context logic 216 (FIG. 2) can cause the OS flag 217 to identify whether the content provided from the content-rendering application 127 to the display 134 is the content being displayed in the window 710. If it is determined that the content provided from the content-rendering application 127 to the display 134 is the content being displayed in the window 710, then it can be inferred that the video is, or is capable of being viewed by a user.

If it is determined in block 612 that the video is not being played or watched in the context of the active process, then the process proceeds to block 618 and the status indicator 145 (FIG. 2) is set to indicate that video is not being viewed. If it is determined in block 612 that the video is being played in the context of the active process, then video either is or is capable of being viewed and the process proceeds to block 614.

In block 614 it is determined whether the sensor array 132 having the proximity sensor 147, light sensor 148, or other sensor or sensors, detects that the user device 102 is unable to display video, or whether a user is unable to view video. Examples of the user device 102 being unable to display video include the display 134 being blocked, covered, turned off, etc. Examples of a user not being capable of viewing a video include the user device 102 being placed near a user's ear as would be the case in a telephone mode of operation so that a user is unable to view the monitor or display. For example, the sensor logic 218 can receive one or more inputs from the sensor array 132 indicating the position, proximity, or other attributes of the user device 102. In an embodiment where the user device 102 is a pair of glasses having a display, the proximity sensor 147 can include logic and functionality to determine whether the glasses are being worn, whether the glasses are closed, and whether the glasses are folded. Alternatively, the user presence detection logic can include logic and functionality to determine whether a user is viewing the display of the glasses, or whether the user is viewing a live-action scene, where the user viewing a live-action scene indicates that the user is not viewing the display. The sensor logic can process these inputs to determine whether that the user device 102 is unable to display video, or whether a user is unable to view video.

If it is determined in block 614 that the user device 102 is unable to display video, or whether a user is unable to view video, then the process proceeds to block 618 and the status indicator 145 (FIG. 2) is set to indicate that video is not being viewed. If it is determined in block 614 that the user device 102 is able to display video, or whether a user is able to view video, then video either is or is capable of being viewed then the process proceeds to block 616.

In block 616 it is determined whether a user is present to view video. For example, the camera 128 can be used to capture an image of a user's face located in a position that enables the user to view the display 134. The camera 128 and/or a related software application (not shown) being unable to image a face of a user may indicate that the user is not facing the display 134. For example, the user presence detection logic 232 (FIG. 2) can receive an input from the camera 128 in which the user's face is present or not present. If the user's face is not present, then it can be inferred that the user is not capable of viewing video.

If it is determined in block 616 that the user is not present to view video, then the process proceeds to block 618 and the status indicator 145 (FIG. 2) is set to indicate that video is not being viewed. If it is determined in block 616 that the user is present to view video, then video either is or is capable of being viewed and the process returns to block 602.

In block 622, it is determined whether the received content has de-interleaved (or multiple) channels and whether the standard supports de-interleaved (or multiple) channels. If it is determined that the received content has de-interleaved (or multiple) channels and that the standard supports de-interleaved (or multiple) channels, then the process proceeds to block 624 where the user device 102 requests a content standard segment having audio only. A content segment having only audio capitalizes on the realization that a user is not viewing, or a user device 102 is not capable of displaying video, and a content segment having only audio will consume a significantly smaller amount of bandwidth than a content segment having video.

As an example, a first content segment may have a first content quality including audio data and video data, while a second content segment may have a second content quality including audio data, but lacking video data. Alternatively, a first content segment may have a first content quality including audio data, while the first content quality lacks video data, and a second content segment may have a second content quality including audio data and video data.

If it is determined in block 622 that the received content does not have de-interleaved (or multiple) channels or that the standard does not support de-interleaved (or multiple) channels, then the process proceeds to block 626 where the user device 102 requests a content segment having a lower resolution or a lower bit rate because video is not being viewed or is not capable of being viewed. A content segment having a lower resolution or a lower bit rate will have a lower quality, but a lower quality is considered to be acceptable in situations where the user is not viewing, or the user device 102 is not capable of displaying video.

As an example, a content segment may have a first content quality including a first video resolution, while a second content segment may have a second content quality including a second video resolution that is lower than the first video resolution. Alternatively, a first content segment may have a first content quality including a first video resolution, while a second content segment may have a second content quality including a second video resolution that is higher than the first video resolution. Alternatively, a first content segment may have a first content quality including a first audio bit rate, while a second content segment may have a second content quality including a second audio bit rate that is lower than the first audio bit rate. Alternatively, a first content segment may have a first content quality including a first audio bit rate, while a second content segment may have a second content quality including a second audio bit rate that is higher than the first audio bit rate.

In another embodiment, a method for altering bandwidth consumption when receiving content in a user device may include determining a first user device status where the first user device status indicates whether there is a display externally connected to the user device that is larger than an internal display of the user device. The method may further include based on the first user device status, selecting one of a plurality of available alternative content segments. The method may further include receiving the selected content segment. For example, if a user device with a relatively small display (e.g., a phone) is connected to relatively large display using an HDMI cable during a session, the user device may switch to requesting video having a higher resolution. Similarly, if the user device with a relatively small display is disconnected from the relatively large display, the user device may switch to requesting video having a lower resolution.

In another embodiment, a method for altering bandwidth consumption when receiving content in a user device may include determining a first user device status where the first user device status indicates a size of a window that is associated with a content-rendering application that is accessing the content. The method may further include based on the first user device status, selecting one of a plurality of available alternative content segments. The method may further include receiving the selected content segment. For example, if the window is enlarged and/or maximized, the user device may switch to requesting video having a higher resolution. Similarly, if the window is reduced and/or minimized, the user device may switch to requesting video having a lower resolution and/or switch to requesting only audio.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both non-transitory computer-readable computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and Blu-Ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A method for altering bandwidth consumption when receiving content in a user device, comprising:

accessing, by a content-rendering application using an adaptive streaming protocol file that identifies alternative sets of content segments for first content including a first set of content segments for the first content encoded for displaying the first content at a first content quality and an alternative second set of content segments for the first content encoded for displaying the first content at a different second content quality, one or more content segments of the first set of content segments for the first content encoded for displaying the first content at the first content quality;

determining a first user device status where the first user device status indicates whether content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on a display of the user device; and based on the first user device status that indicates whether the content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on the display of the user device, accessing, by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, one or more content segments of the second set of content segments for the first content encoded for displaying the first content at the different second content quality.

2. The method of claim 1, wherein determining a first user device status comprises determining whether a tab, which is associated with the content-rendering application, is selected.

3. The method of claim 1, wherein determining a first user device status comprises determining whether a window, which is associated with the content-rendering application and configured to display content, is visible.

4. The method of claim 1, wherein determining a first user device status comprises determining whether a window, which is associated with the content-rendering application and configured to display content, is minimized.

5. The method of claim 1, wherein determining a first user device status comprises determining whether a first window, which is associated with the content-rendering application and configured to display content, is at least partially covered by a second window.

6. The method of claim 1, further comprising:

based on the first user device status that indicates whether the content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on the display of the user device:
  switching from requesting via Hypertext Transfer Protocol (HTTP) and rendering at least one content segment of the first set of content segments for the first content encoded for displaying the first content at the first content quality; and
  switching to requesting via Hypertext Transfer Protocol (HTTP) and rendering at least one content segment of the second set of content segments for the first content encoded for displaying the first content at the different second content quality.

7. The method of claim 1, wherein determining a first user device status comprises analyzing a proximity parameter of the user device.

8. The method of claim 1, wherein determining a first user device status comprises determining whether a display of the user device is covered.

9. The method of claim 8, wherein determining whether a display of the user device is covered comprises using a light sensor to sense ambient light to determine whether a display of the user device is covered.

10. The method of claim 8, wherein determining whether a display of the user device is covered comprises using a photocell to sense ambient light to determine whether a display of the user device is covered.

11. The method of claim 8, wherein determining whether a display of the user device is covered comprises using a camera to determine whether a display of the user device is covered.

12. The method of claim 7, wherein the user device is a pair of glasses having a display; and
  wherein analyzing a proximity parameter of the user device comprises determining whether the glasses are being worn.

13. The method of claim 1, wherein the user device is a pair of glasses having a display; and
  wherein determining a first user device status comprises determining whether the glasses are closed.

14. The method of claim 1, wherein the user device is a pair of glasses having a display; and
  wherein determining a user device status comprises determining whether the glasses are folded.

15. The method of claim 1, wherein the user device is a pair of glasses having a display; and
  wherein determining a first user device status comprises determining whether the user is viewing the display of the glasses.

16. The method of claim 15, further comprising determining whether the user is viewing a live-action scene, where the user viewing a live-action scene indicates that the user is not viewing the display.

17. An apparatus for altering bandwidth consumption when receiving content in a user device, comprising:
  a content-rendering application configured to access, using an adaptive streaming protocol file that identifies alternative sets of content segments for first content including a first set of content segments for the first content encoded for displaying the first content at a first content quality and an alternative second set of content segments for the first content encoded for displaying the first content at a different second content quality, one or more content segments of the first set of content segments for the first content encoded for displaying the first content at the first content quality;
  a device status determination element configured to determine a first user device status where the first user device status indicates whether content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on a display of the user device;
  streaming content logic configured to access, by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, one or more content segments of the second set of content segments for the first content encoded for displaying the first content at the different second content quality, based on the first user device status that indicates whether the content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on the display of the user device; and
  the content-rendering application configured to render the accessed content segment.

18. The apparatus of claim 17, wherein the device status determination element comprises logic configured to determine whether a tab, which is associated with the content-rendering application, is selected.

19. The apparatus of claim 17, wherein the device status determination element comprises logic configured to determine whether a window, which is associated with the content-rendering application and configured to display content, is visible.

20. The apparatus of claim 17, wherein the device status determination element comprises logic configured to determine whether a window, which is associated with the content-rendering application and configured to display content, is minimized.

21. The apparatus of claim 17, wherein the device status determination element comprises logic configured to determine whether a first window, which is associated with the content-rendering application and configured to display content, is at least partially covered by a second window.

22. The apparatus of claim 17, further comprising:
  the user device, based on the first user device status that indicates whether the content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on the display of the user device, configured to:

switch from requesting via Hypertext Transfer Protocol (HTTP) and rendering at least one content segment of the first set of content segments for the first content encoded for displaying the first content at the first content quality; and switch to requesting via Hypertext Transfer Protocol (HTTP) and rendering at least one content segment of the second set of content segments for the first content encoded for displaying the first content at the different second content quality.

23. The apparatus of claim 17, wherein the logic configured to determine a first user device status comprises logic configured to analyze a proximity parameter of the user device.

24. The apparatus of claim 17, wherein the device status determination element configured to determine a first user device status comprises logic configured to determine whether a display of the user device is covered.

25. The apparatus of claim 24, wherein the logic configured to determine whether a display of the user device is covered comprises using a light sensor to sense ambient light to determine whether a display of the user device is covered.

26. The apparatus of claim 24, wherein the logic configured to determine whether a display of the user device is covered comprises using a photocell to sense ambient light to determine whether a display of the user device is covered.

27. The apparatus of claim 24, wherein the logic configured to determine whether a display of the user device is covered comprises using a camera to determine whether a display of the user device is covered.

28. The apparatus of claim 23, wherein the user device is a pair of glasses having a display; and
wherein the logic configured to analyze a proximity parameter of the user device comprises logic configured to determine whether the glasses are being worn.

29. The apparatus of claim 17, wherein the user device is a pair of glasses having a display; and
wherein the device status determination element comprises logic configured to determine whether the glasses are closed.

30. The apparatus of claim 17, wherein the user device is a pair of glasses having a display; and
wherein the device status determination element comprises logic configured to determine whether the glasses are folded.

31. The apparatus of claim 17, wherein the user device is a pair of glasses having a display; and
wherein the device status determination element comprises logic configured to determine whether the user is viewing the display of the glasses.

32. The apparatus of claim 31, further comprising logic configured to determine whether the user is viewing a live-action scene, where the user viewing a live-action scene indicates that the user is not viewing the display.

33. A user device comprising:
means for accessing, by a content-rendering application using an adaptive streaming protocol file that identifies alternative sets of content segments for first content including a first set of content segments for the first content encoded for displaying the first content at a first content quality and an alternative second set of content segments for the first content encoded for displaying the first content at a different second content quality, one or more content segments of the first set of content segments for the first content encoded for displaying the first content at the first content quality;

means for determining a first user device status where the first user device status indicates whether content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on a display of the user device; and means for, based on the first user device status that indicates whether the content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on the display of the user device, accessing, by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, one or more content segments of the second set of content segments for the first content encoded for displaying the first content at the different second content quality.

34. The user device of claim 33, wherein the means for determining a first user device status comprises means for determining whether a tab, which is associated with the content-rendering application, is selected.

35. The user device of claim 33, wherein the means for determining a first user device status comprises means for determining whether a window, which is associated with the content-rendering application and configured to display content, is visible.

36. The user device of claim 33, wherein the means for determining a first user device status comprises means for determining whether a window, which is associated with the content-rendering application and configured to display content, is minimized.

37. The user device of claim 33, wherein the means for determining a first user device status comprises means for determining whether a first window, which is associated with the content-rendering application and configured to display content, is at least partially covered by a second window.

38. A non-transitory computer-readable medium including processor-executable instructions for performing a method for altering bandwidth consumption when receiving content in a user device, the method comprising:

accessing, by a content-rendering application using an adaptive streaming protocol file that identifies alternative sets of content segments for first content including a first set of content segments for the first content encoded for displaying the first content at a first content quality and an alternative second set of content segments for the first content encoded for displaying the first content at a different second content quality, one or more content segments of the first set of content segments for the first content encoded for displaying the first content at the first content quality;

determining a first user device status where the first user device status indicates whether content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on a display of the user device; and based on the first user device status that indicates whether the content, which is derived from the one or more content segments of the first set of content segments for the first content accessed by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, is viewable on the display of the user device, accessing, by the content-rendering application using the adaptive streaming protocol file that identifies the alternative sets of content segments for the first content including the first set of content segments for the first content encoded for displaying the first content at the first content quality and the alternative second set of content segments for the first content encoded for displaying the first content at the different second content quality, one or more content segments of the second set of content segments for the first content encoded for displaying the first content at the different second content quality.

39. The non-transitory computer-readable medium of claim 38, wherein determining a first user device status comprises determining whether a tab, which is associated with the content-rendering application, is selected.

40. The non-transitory computer-readable medium of claim 38, wherein determining a first user device status comprises determining whether a window, which is associated with the content-rendering application and configured to display content, is visible.

41. The non-transitory computer-readable medium of claim 38, wherein determining a first user device status comprises determining whether a window, which is associated with the content-rendering application and configured to display content, is minimized.

42. The non-transitory computer-readable medium of claim 38, wherein determining a first user device status comprises determining whether a first window, which is associated with the content-rendering application and configured to display content, is at least partially covered by a second window.

\* \* \* \* \*